United States Patent [19]
Nakajima et al.

[11] Patent Number: 6,079,732
[45] Date of Patent: Jun. 27, 2000

[54] STRUCTURE FOR ARRANGEMENT OF OCCUPANT PROTECTIVE APPARATUS FOR VEHICLE

[75] Inventors: Hiroki Nakajima, Nagoya; Shuji Miura, Okazaki, both of Japan; Nobuyasu Yamada, Plymouth, Mich.; Minoru Shibata, Inazawa, Japan; Yutaka Nagai, Ichinomiya, Japan; Hiroyuki Tajima, Chiryu, Japan; Fumitake Kobayashi, Inazawa, Japan

[73] Assignees: Toyota Jidosha Kabushiki Kaisha, Toyota; Toyoda Gosei Co., Ltd., Nishikasugai-gun, both of Japan

[21] Appl. No.: 08/965,187

[22] Filed: Nov. 6, 1997

[30] Foreign Application Priority Data

Nov. 7, 1996 [JP] Japan ................................. 8-295548
Oct. 22, 1997 [JP] Japan ................................. 9-289475

[51] Int. Cl.$^7$ .................................................. B60R 21/16
[52] U.S. Cl. ................................. 280/728.2; 280/730.2; 280/728.1
[58] Field of Search ........................... 280/727, 728.1, 280/728.2, 730.2, 728.3, 751, 752

[56] References Cited

U.S. PATENT DOCUMENTS

| | | |
|---|---|---|
| 5,163,730 | 11/1992 | Welch . |
| 5,382,051 | 1/1995 | Glance . |
| 5,462,308 | 10/1995 | Seki et al. . |
| 5,490,691 | 2/1996 | Sinnhuber et al. ..................... 280/735 |
| 5,609,385 | 3/1997 | Daniel et al. .......................... 296/188 |
| 5,791,683 | 8/1998 | Shibata et al. ........................ 280/730.2 |
| 5,833,303 | 11/1998 | Kawai et al. .......................... 296/189 |
| 5,836,641 | 11/1998 | Sugamoto et al. ..................... 296/189 |
| 5,884,937 | 3/1999 | Yamada ................................. 280/730.2 |

FOREIGN PATENT DOCUMENTS

| | | |
|---|---|---|
| 2122189 | 8/1972 | France . |
| 2338025 | 7/1974 | Germany . |
| 19613095 | 2/1997 | Germany . |
| 6-227340 | 8/1994 | Japan . |
| 6-344841 | 12/1994 | Japan . |
| 7-187008 | 7/1995 | Japan . |
| 7-246953 | 9/1995 | Japan . |
| 7-251422 | 10/1995 | Japan . |
| 8/1982 | 1/1996 | Japan . |
| 8-119047 | 5/1996 | Japan . |
| 8-230603 | 9/1996 | Japan . |
| 2261636 | 5/1993 | United Kingdom . |
| WO 96/26087 | 8/1996 | WIPO . |

*Primary Examiner*—J. J. Swann
*Assistant Examiner*—Faye M. Fleming
*Attorney, Agent, or Firm*—Pillsbury Madison & Sutro LLP

[57] ABSTRACT

A structure for arrangement of an occupant protective apparatus for a vehicle includes: an inflator disposed at a predetermined position of a vehicle body and adapted to eject a gas at a time of a side collision when a high load is applied to a side of the vehicle body; a bag stored in a folded state in such a manner as to extend between a front pillar and a roof side rail and adapted to be inflated in a shape of a curtain below the roof side rail in a vehicle compartment by a gas supplied from the inflator, the bag being disposed in a space formed between a body panel and an interior member disposed on an inner side of the vehicle compartment with a predetermined interval with the body panel; and an energy absorbing member provided in the space and disposed in close proximity to the bag so as to absorb an impact from the inner side of the vehicle compartment.

9 Claims, 11 Drawing Sheets

STRUCTURE FOR ARRANGEMENT OF OCCUPANT PROTECTIVE APPARATUS FOR VEHICLE

BACKGROUND OF THE INVENTION

1. Field of the Invention

The present invention relates to a structure for arrangement of an occupant protective apparatus for a vehicle in which a bag stored in a folded state in such a manner as to extend between a front pillar and a roof side rail is inflated below the roof side rail in a vehicle compartment in the shape of a curtain by a gas ejected from an inflator during a side collision when a high load is applied to a side of the vehicle body.

2. Description of the Related Art

Conventionally, vehicle occupant protective apparatuses have already been proposed in which, in order to improve the performance of protecting the head of a vehicle occupant during a side collision, an inflator disposed in a front pillar is actuated so as to inflate a curtain-shaped air bag stored between an interior member and a body panel in such a manner as to extend between the front pillar and the roof side rail. Hereafter, a description will be given of the arrangement shown in Japanese Patent Application Laid-Open (JP-A) No. 6-227340 which discloses this type of vehicle occupant protective apparatus.

As shown in FIG. 11, a vehicle occupant protective apparatus 400 has as its main component elements a sensor 402 for detecting the state of a side collision, an inflator 404 for ejecting a gas as it is actuated upon detection of the state of the side collision by the sensor 402, and an elongated bag 412 which is arranged in such a manner as to extend from an upper end portion of a front pillar 406 along a roof side rail 408, and which is stored in a trim 410 in a folded state. Incidentally, a front end portion of the bag 412 is connected to an upper end portion of the inflator 404, and a rear end portion of the bag 412 is located at a front position of a center pillar 414.

In accordance with the above-described arrangement, when the side collision is detected by the sensor 402, the inflator 404 is actuated to eject a gas. Consequently, the ejected gas is supplied to the interior of the bag 412, and the trim 410 is deployed under the inflationary pressure of the bag 412. As a result, the bag 412 which has swollen in the shape of a curtain is interposed between the head of the vehicle occupant and the side surface of a vehicle compartment.

However, with the above-described arrangement, it is necessary to fold the bag 412 tightly in order to store the bag 412 in a narrow space between the front pillar 406 and the trim 410. For this reason, it is conceivable that the amount of energy absorption for the load in the secondary collision of the head of the occupant during a side collision of a low load (i.e., when the load of a side collision is applied to such an extent that the vehicle occupant protective apparatus 400 is not actuated) becomes insufficient if only the tightly folded bag 412 alone is used.

In relation to the invention of this application, Japanese Patent Application No. 7-187008 discloses a technique in which a buffer material, such as a hard urethane foam, a semi hard urethane foam, styrofoam, and foamed polypropylene, is disposed in a space between the roof side rail and a roof lining. Japanese Patent Application No. 7-246953 discloses a technique in which impact absorbing ribs which are made of a resin and are shaped in the form of a grid are disposed in the space between the roof side rail and the roof lining. Japanese Patent Application No. 8-119047 discloses a technique in which impact absorbing ribs which are made of a resin and are shaped in the form of a grid are disposed in a space between a front pillar inner panel and a pillar garnish.

SUMMARY OF THE INVENTION

In view of the above-described circumstances, it is an object of the present invention to provide a structure for arrangement of an occupant protective apparatus for a vehicle in which, even if an arrangement is adopted in which the bag is stored in a folded state between the body panel and the interior member, it is possible to reliably absorb the load in the secondary collision of the head of the occupant during the side collision of a low load.

In accordance with a first aspect of the present invention, there is provided a structure for arrangement of an occupant protective apparatus for a vehicle, comprising: an inflator disposed at a predetermined position of a vehicle body and adapted to eject a gas at a time of a side collision when a high load is applied to a side of the vehicle body; a bag stored in a folded state in such a manner as to extend between a front pillar and a roof side rail and adapted to be inflated in a shape of a curtain below the roof side rail in a vehicle compartment by a gas supplied from the inflator, the bag being disposed in a space formed between a body panel and an interior member disposed on an inner side of the vehicle compartment with a predetermined interval with the body panel; and an energy absorbing member provided in the space and disposed in close proximity to the bag so as to absorb an impact from the inner side of the vehicle compartment.

In accordance with a second aspect of the present invention, in the structure for arrangement of an occupant protective apparatus for a vehicle according to the first aspect of the invention, the bag is located closer to a vehicle door opening than the energy absorbing member.

In accordance with a third aspect of the present invention, in the structure for arrangement of an occupant protective apparatus for a vehicle according to the first aspect of the invention, the height of the energy absorbing member extending from the body panel toward an inner side of the vehicle compartment is set to be larger than the height of the bag in the folded state.

In accordance with a fourth aspect of the present invention, in the structure for arrangement of an occupant protective apparatus for a vehicle according to the first aspect of the invention, at least the bag and the energy absorbing member are integrally assembled in advance, and at least the bag and the energy absorbing member which have been integrally assembled in advance are jointly fastened to the body panel.

In accordance with a fifth aspect of the present invention, in the structure for arrangement of an occupant protective apparatus for a vehicle according to the first aspect of the invention, the energy absorbing member has an extending portion which is provided in such a manner as to extend between the bag and a pillar inner panel which is a portion of the body panel in a vicinity of the front pillar.

In accordance with a sixth aspect of the present invention, the structure for arrangement of an occupant protective apparatus for a vehicle according to the first aspect of the invention further comprises: a case disposed in the space formed between the body panel and the interior member disposed on the inner side of the vehicle compartment with the predetermined interval with the body panel, the case being formed in an elongated shape and adapted to accommodate the bag.

In accordance with a seventh aspect of the present invention, in the structure for arrangement of an occupant protective apparatus for a vehicle according to the first aspect of the invention, the energy absorbing member is a rib made of a resin.

In accordance with an eighth aspect of the present invention, in the structure for arrangement of an occupant protective apparatus for a vehicle according to the first aspect of the invention, the energy absorbing member is constituted by a base member formed of a foam material and disposed on the inner side of the vehicle compartment with respect to the front pillar, and the bag is accommodated in a recessed portion provided in the base member.

In accordance with a ninth aspect of the present invention, in the structure for arrangement of an occupant protective apparatus for a vehicle according to the eighth aspect of the invention, the energy absorbing member is provided with an energy absorbing member disposed in a portion of the base member and having an energy absorption characteristic different from that of the base member.

The operation in accordance with the first aspect of the present invention is as follows.

During the side collision of a high load, a gas is ejected from the inflator. For this reason, the bag which is stored in a folded state in such a manner as to extend between the front pillar and the roof side rail is inflated in the shape of a curtain below the roof side rail in the vehicle compartment. As a result, the bag is interposed between the side of the vehicle body and the head of the occupant, thereby protecting the head of the occupant.

On the other hand, during the side collision of a low load, the inflator is not actuated. Accordingly, the bag is not inflated to be disposed between the side of the vehicle body and the head of the occupant. However, in this case as well, there are cases where, due to the inertial force at the time of the side collision, the head of the occupant secondarily collides against an interior member disposed on a vehicle compartment inner side of the body panel with a predetermined interval therebetween. In this case, in the present invention, the bag is disposed in the space between the body panel and the interior member, and the energy absorbing member is juxtaposed in close proximity to the bag, so that the load in the secondary collision of the head of the occupant is absorbed by the energy absorbing member.

In accordance with the second aspect of the present invention, since the bag is located closer to the vehicle door opening than the energy absorbing member, the bag is inflated and deployed speedily and smoothly between the side of the vehicle body and the head of the occupant during the side collision of a high load, thereby protecting the head of the occupant. That is, it is possible to prevent the deployment of the bag from being hampered by the energy absorbing member.

Meanwhile, during the side collision of a low load when the inflator is not actuated, the energy absorbing member is disposed at a position where the head of the occupant easily abuts, so that the load in the secondary collision of the head of the occupant can be effectively absorbed by the energy absorbing member.

In accordance with the third aspect of the present invention, since the height of the energy absorbing member extending from the body panel toward the inner side of the vehicle compartment is set to be larger than the height of the bag, during the side collision of a low load, the head of the occupant first abuts against the energy absorbing member, so that the load in the secondary collision of the head of the occupant can be reliably absorbed by the energy absorbing member.

In accordance with the fourth aspect of the present invention, since at least the bag and the energy absorbing member are integrally assembled in advance, and the integrally assembled bag and energy absorbing member are jointly fastened to the body panel, as compared with a case where both members are separately and independently assembled onto the body panel, it is possible to attain a reduction in the number of members fastened and the number of assembling steps and shorten the assembly operation time. Consequently, an outstanding advantage is offered in that it is possible to attain a substantial reduction in cost.

In accordance with the fifth aspect of the present invention, a portion of the energy absorbing member is made to extend toward the bag, and the extending portion is provided between the bag and the pillar inner panel which is a portion of the body panel in the vicinity of the front pillar, it is possible to obtain the energy absorption effect on the bag side, in addition to the energy absorption effect of the energy absorbing member juxtaposed to the bag. As a result, and outstanding advantage is offered in that it is possible to improve the performance of protecting the head of the occupant during the side collision of a low load.

In accordance with the sixth aspect of the present invention, since the bag is accommodated in an elongated case, it is possible to prevent foreign objects from entering the interior of the bag, and it is possible to expect an energy absorbing effect derived from the case itself. Additionally, handling is also facilitated.

In accordance with the seventh aspect of the present invention, since a rib made of a resin is used as the energy absorbing member, by adjusting the hardness of the resin, thickness, the number of pieces provided, and the like of the ribs, it is possible to obtain an intended energy absorption effect. As a result, it is possible to further improve the performance of protecting the head of the occupant during the side collision of a low load.

In accordance with the eighth aspect of the present invention, since the energy absorbing member is constituted by a base member formed of a foam material and disposed on the inner side of the vehicle compartment with respect to the front pillar, and the bag is accommodated in a recessed portion provided in the base member, the load in the secondary collision of the head of the occupant during the side collision of a load is absorbed by the base member formed of a foam material. Moreover, since the energy absorbing member is arranged by forming the base member of a foam material, it is possible to obtain an intended energy absorbing effect by adjusting the material, hardness, and the like of the foam material. Incidentally, since the base member is formed of a foam material, the deployment of the base member is effected smoothly when the bag is inflated. As a result, it is possible to further improve the performance of protecting the head of the occupant during the side collision of a low load.

In addition, in accordance with this aspect of the present invention, since the recessed portion provided in the base member also functions as the case for accommodating the bag, the case can be disused. Moreover, since the base member serving as the energy absorbing member can be obtained by the foaming of the foam material, it is unnecessary to separately provide an energy absorbing member. For these reasons, an outstanding advantage is offered in that it is possible to reduce the number of parts and effect a reduction in cost.

In accordance with the ninth aspect of the present invention, since an energy absorbing member having an energy absorption characteristic different from that of the base member is disposed in a portion of the base member, it is easily possible to adjust the energy absorption characteristic of the energy absorbing member by suitably selecting the position where the energy absorbing member is disposed, the number of pieces provided, external dimensions, material, hardness, and the like of the energy absorbing member.

The above and other objects, features and advantages of the present invention will become more apparent from the following detailed description of the invention when read in conjunction with the accompanying drawings.

DESCRIPTION OF THE PREFERRED EMBODIMENTS

Referring now to FIGS. 1 to 6, a description will be given of a first embodiment of the present invention.

Figure 2:
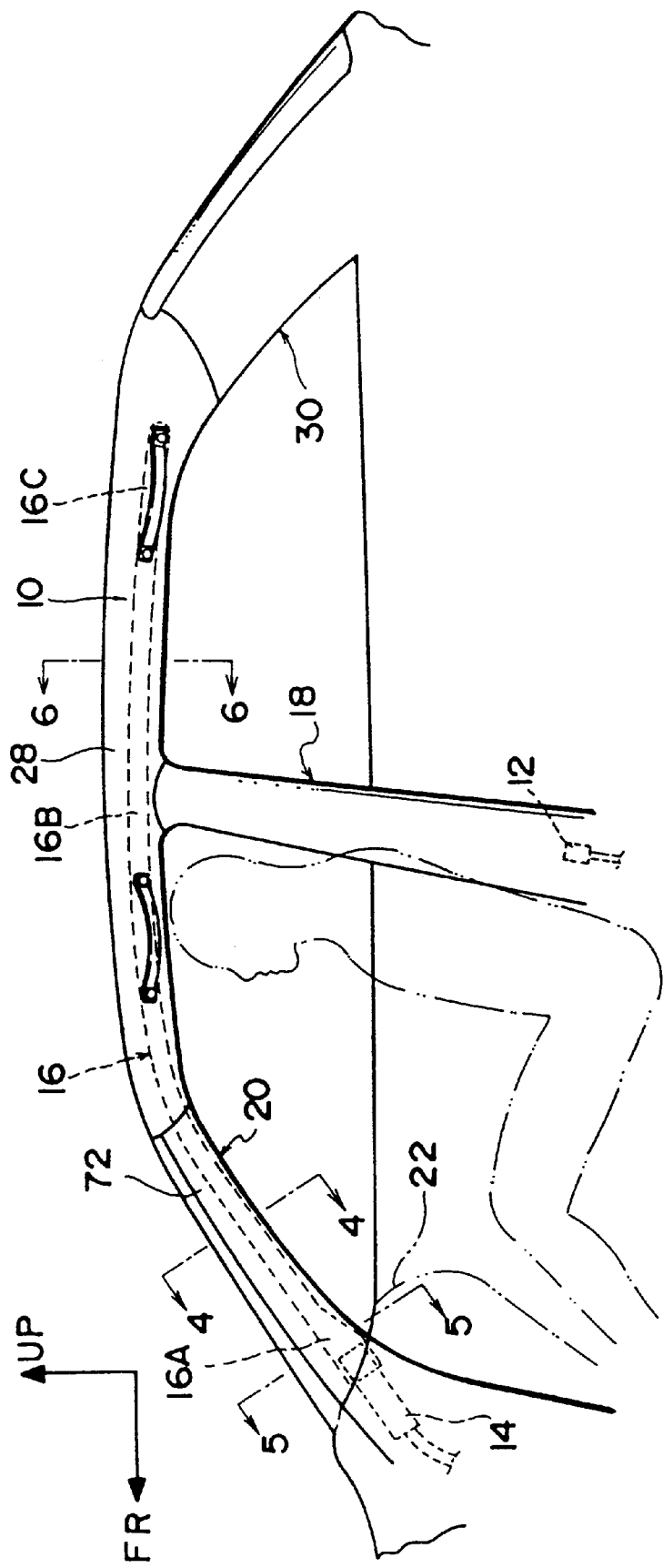
FIG. 2 is a schematic diagram which is a side view illustrating the position where the air bag apparatus shown in FIG. 1 is arranged.
Figure 3:
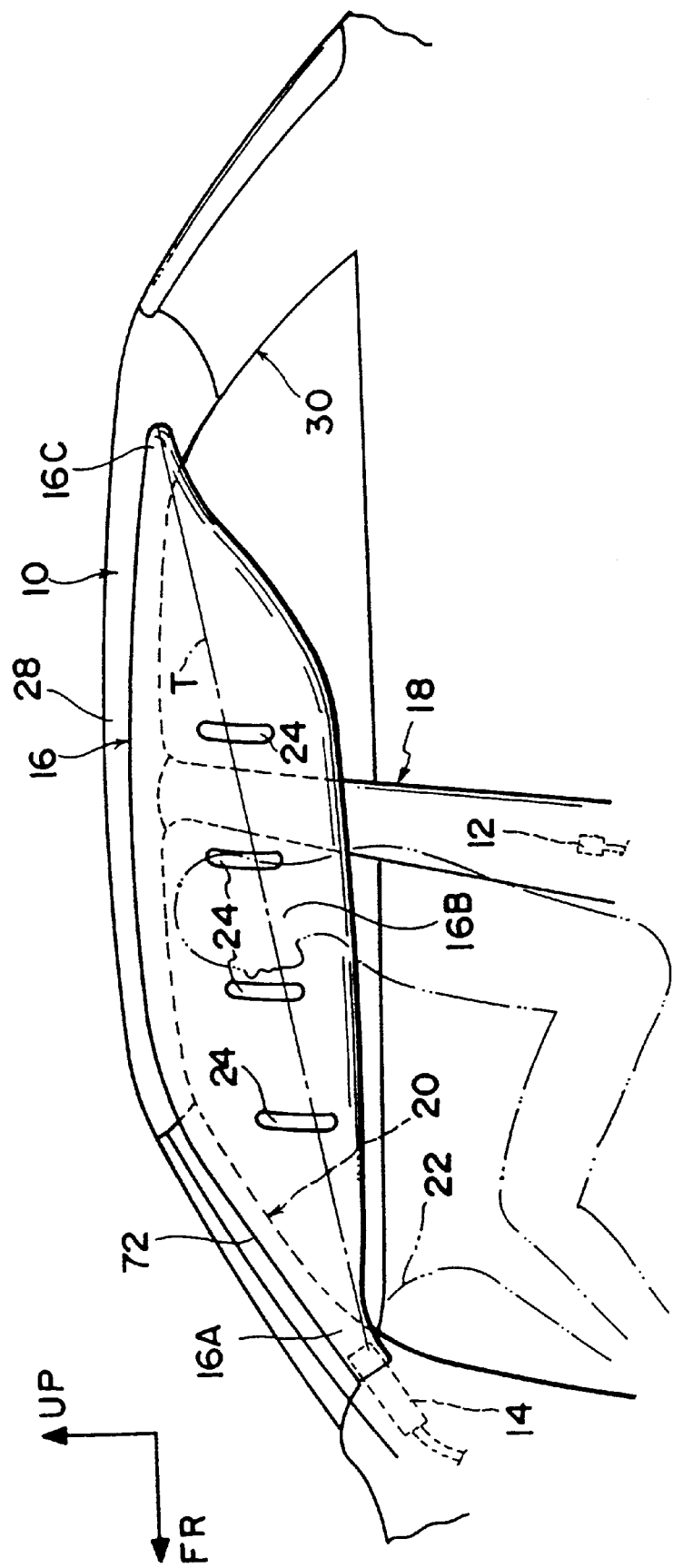
FIG. 3 is a schematic diagram corresponding to FIG. 2 and illustrating a state in which the bag is inflated during a side collision of a high load.

FIGS. 2 and 3 show side elevational views of a schematic arrangement of an air bag apparatus 10 serving as an occupant protective apparatus for a vehicle. As shown in these drawings, the air bag apparatus 10 has as its main component elements a sensor 12 for detecting the state of a side collision due to a high load of a predetermined value or more, a cylindrical inflator 14 for ejecting a gas as it is actuated, and a bag 16 which is folded in a predetermined folding manner. Hereafter, after giving a brief description of these elements in the order mentioned, a description will be given of essential portions in accordance with this embodiment.

The sensor 12 is disposed in the vicinity of a lower end of a center pillar (B pillar) 18, and is adapted to detect the state of a side collision when a high load of a predetermined value or more is applied to a side of the vehicle body.

The inflator 14 is disposed in the vicinity of a connecting portion between a front pillar (A pillar) 20 and an instrument panel 22, and is connected to the aforementioned sensor 12. Accordingly, the inflator 14 is adapted to be actuated when the sensor 12 detects the state of a side collision. It should be noted that if the inflator 14 is disposed in the vicinity of the connecting portion, there is an advantage in that a front end portion 16A of the bag 16 can be directly connected to the inflator 14 as will be described later, but an arrangement may be adopted such that the inflator 14 is disposed in another portion of the vehicle body, and is connected to the front end portion 16A of the bag 16 by means of a tube or the like. In addition, as the inflator 14, it is possible to adopt, among others, a gas-generating agent sealed-in type in which a gas is generated as a gas generating agent sealed in its interior burns, or a high-pressure gas sealed-in type in which a high-pressure gas is ejected as a partition wall provided in its interior is broken.

As shown in FIG. 3, the bag 16 is formed substantially in the shape of a parallelogram in a side view. A vertically intermediate portion of the bag 16 is formed by sewing or the like, and a plurality of noninflated portions 24 are formed at predetermined intervals in such a manner as to traverse a tension line T connecting a front-end fixed point and a rear-end fixed point of the bag 16, which will be described later, and such that the vertical direction of the bag is set as their longitudinal direction. Further, after the bag 16 is folded in a predetermined folding manner and is set in an elongated shape, the bag 16 is accommodated in a case 26 made of a resin (see FIG. 1). Further, the above-described bag 16 is disposed in such a manner as to extend between the front pillar 20 and a roof side rail 28. More specifically, the front end portion 16A of the bag 16 is located at the position where the inflator 14 is disposed, so as to allow the gas ejected from the inflator 14 will flow into the bag 16. An intermediate portion 16B of the bag 16 is arranged along the longitudinal directions of the front pillar 20 and the roof side rail 28, and a rear end portion 16C of the bag 16 is located in the vicinity of a quarter pillar (C pillar) 30. Accordingly, in this embodiment, the bag 16 is used which has a longer length in the longitudinal direction of the vehicle than in the conventional art.

Figure 4:
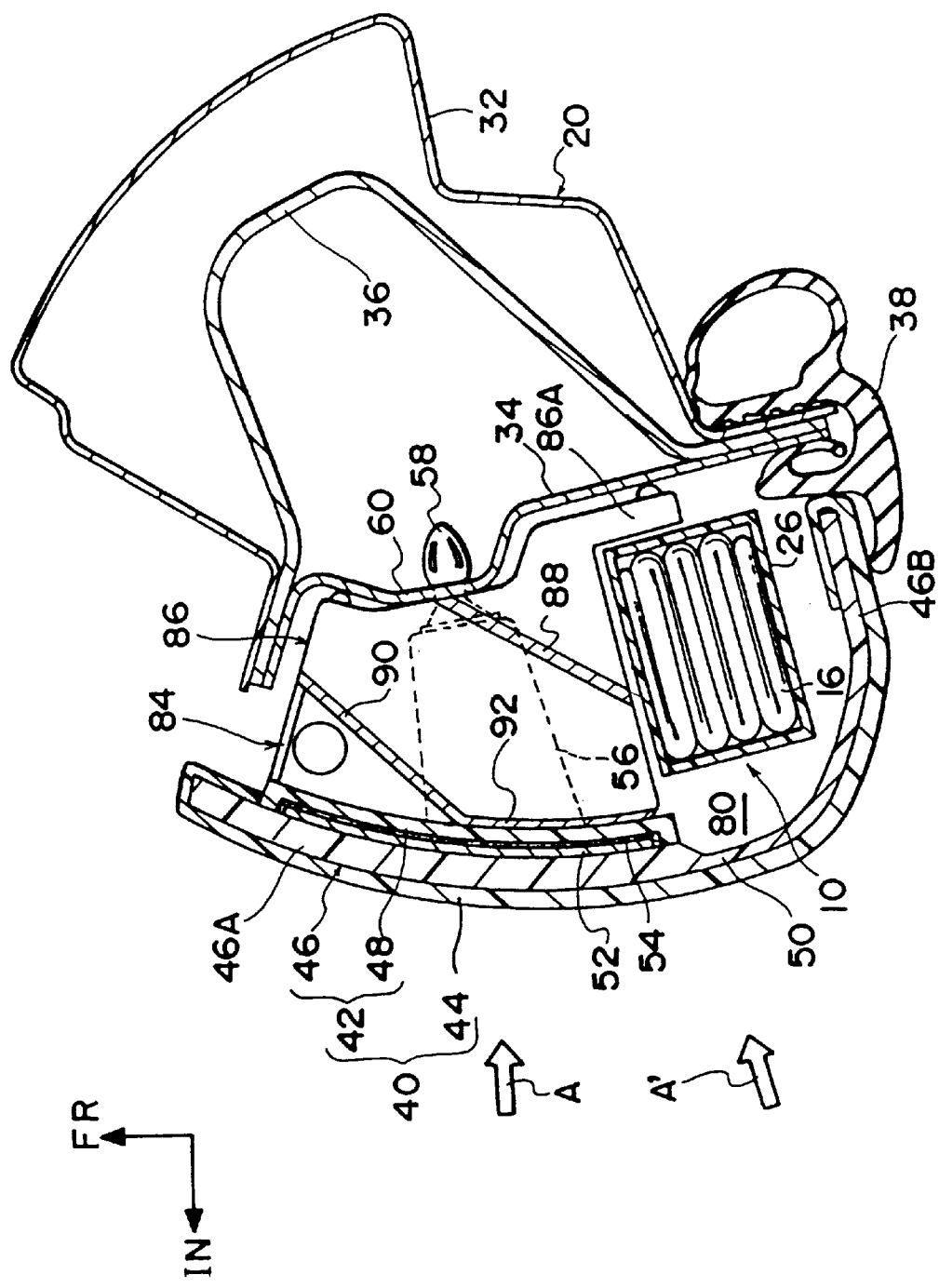
FIG. 4 is a cross-sectional view, taken along line 4—4 of FIG. 2, illustrating in enlarged form the structure in which a general section of the pillar garnish is fixed to a pillar inner panel.
Figure 5:
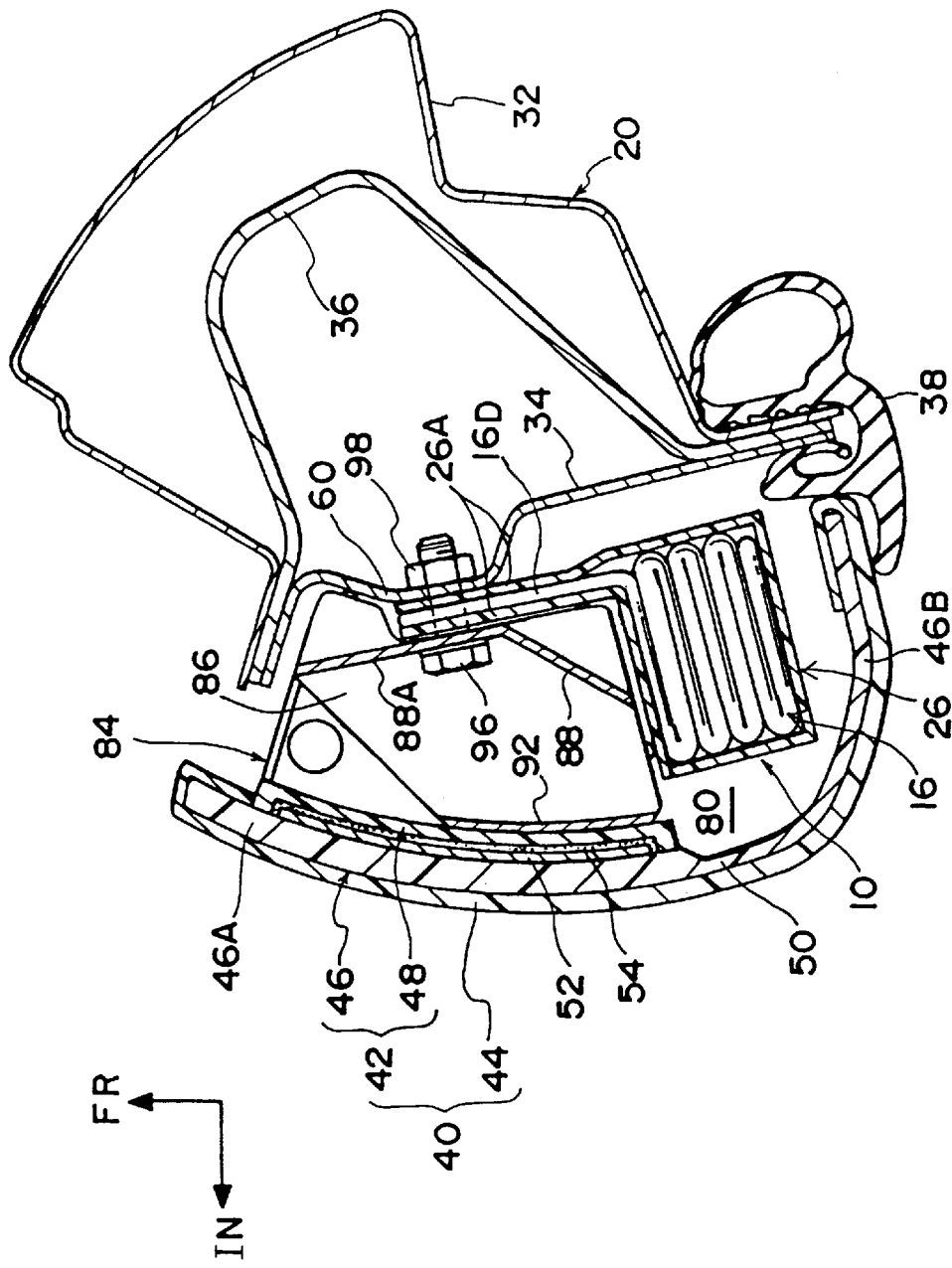
FIG. 5 is a cross-sectional view, taken along line 5—5 of FIG. 2, illustrating in enlarged form the structure in which the energy absorbing member, as well as the bag and the case, are jointly fixed to the pillar inner panel.

Next, a description will be given of the structures of the body and interior members in the vicinities of the front pillar 20. As shown in FIGS. 4 and 5, the front pillar 20 is provided with the structure of a closed section which is formed by a pillar outer panel 32 with a hat-shaped cross section disposed on the outer side of a vehicle compartment, a substantially flat plate-shaped pillar inner panel 34 disposed on the inner side of the vehicle compartment, and a pillar reinforcement 36 with a substantially hat-shaped cross section disposed in such a manner as to be clamped by the pillar outer panel 32 and the pillar inner panel 34. Incidentally, an opening weather strip 38 is resiliently fitted in a rear-end flange portion of the front pillar 20.

A pillar garnish 40 made of resins is provided on the vehicle compartment inner side of the pillar inner panel 34 in the above-described front pillar 20. The pillar garnish 40 is formed by a base member 42 disposed in face-to-face relation to the pillar inner pannel 34 as well as a surface layer 44 for covering the surface (i.e., the surface of the inner side of the vehicle compartment) of this base member 42. Further, the base member 42 is comprised of a soft material 46 made of a soft resin and formed into a convex cylindrically curved shape, as well as a hard material 48 made of a hard resin. A vehicle front-side portion of the soft material 46 is provided with a large thickness (hereafter, this portion will be referred to as a "base portion 46A"), while a vehicle rear-side portion of the soft material 46 is provided with a small thickness (hereafter, this portion will be referred to as a "bag accommodating portion 46B"). Therefore, the bag accommodating portion 46B is arranged to be elastically deformable centering on a hinge portion 50 serving as a portion of its connection to the base portion 46A. Incidentally, a vehicle outer-side end portion of the bag accommodating portion 46B is resiliently retained by the aforementioned opening weather strip 38.

In addition, the aforementioned hard material 48 is secured to the vehicle outer-side surface of the base portion 46A of the soft material 46 by means of an adhesive 54 with a belt-shaped strap 52 placed therebetween. Incidentally, the hard material 48 and the soft material 46 may be formed integrally by double injection molding. In addition, upper and lower end portions of the strap 52 are bolted to the pillar inner panel 34 for preventing the scattering of the pillar garnish 40 during the inflation of the bag. Further, an attaching seat 56 with a trapezoidal shape is formed integrally on the hard material 48 with an appropriate interval therebetween. The attaching seat 56 is secured to a projection 60 formed on the pillar inner panel 34 by means of a clip 58 made of a resin (see FIG. 4), thereby fixing the general section of the pillar garnish 40.

Figure 6:
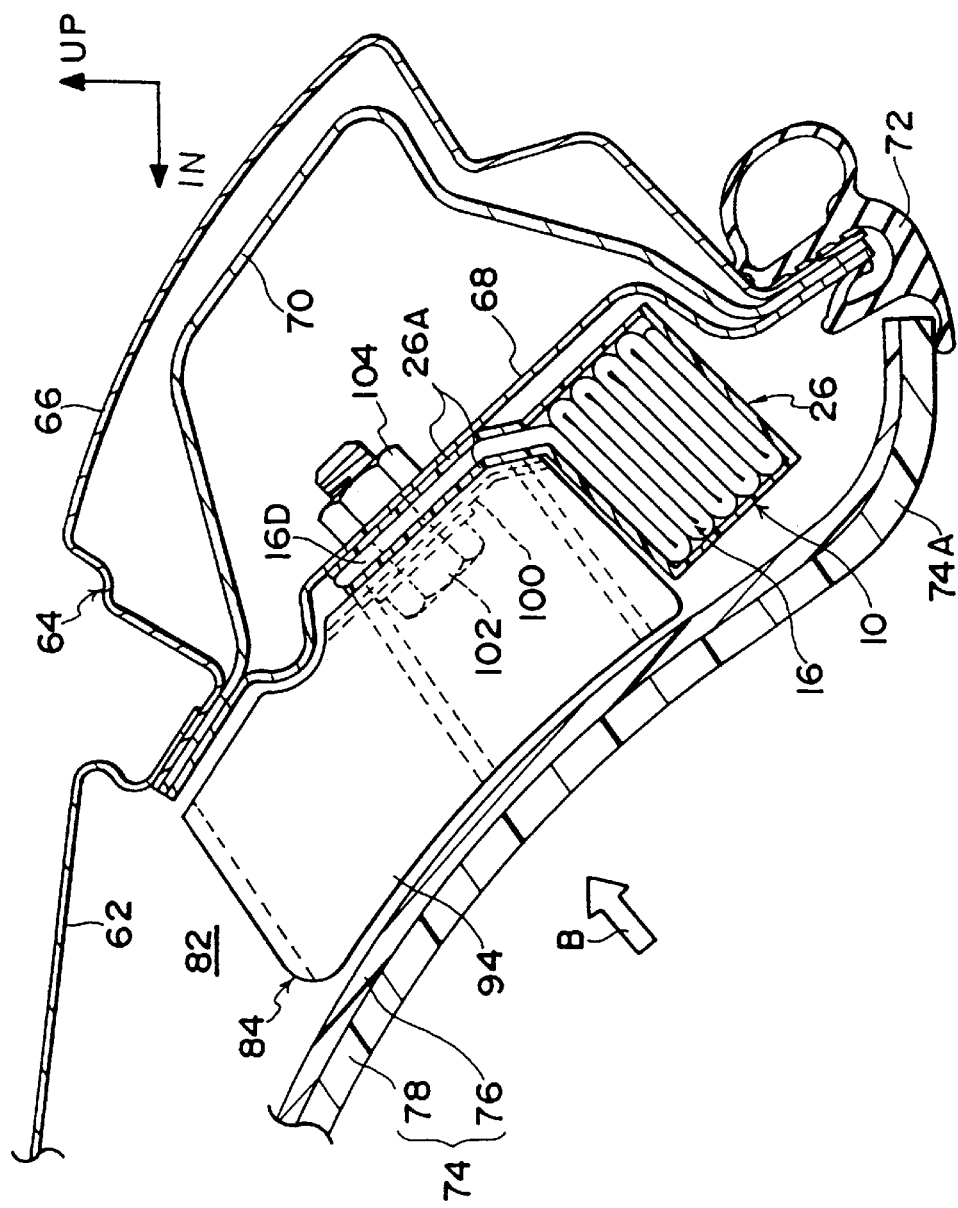
FIG. 6 is a cross-sectional view, taken along line 6—6 of FIG. 2, illustrating in enlarged form the structure in which the energy absorbing member, as well as the bag and the case, are jointly fixed to a rail inner panel.

Next, a description will be given of the structures of the body and interior members in the vicinities of the roof side rail 28. As shown in FIG. 6, a roof rail section 64 is provided at a vehicle transversely outer end portion of a roof panel 62. The roof rail section 64 is provided with the structure of a closed section which is formed by a rail outer panel 32 with a substantially hat-shaped cross section projecting by a relatively large degree toward the outer side of the vehicle compartment, a rail inner panel 68 projecting slightly toward the interior of the rail outer panel 66, a rail reinforcement 70 formed with a substantially hat-shaped cross section along the cross-sectional configuration of the rail outer panel 66 and disposed in such a manner as to be clamped by the rail outer panel 66 and the rail inner panel 68. An upper end portion of the roof rail section 64 formed by the aforementioned three members is joined to the vehicle transversely outer end portion of the roof panel 62 by welding, and an opening weather strip 72 is fitted in a lower end portion of the roof rail section 64.

A roof head lining (i.e., a molded ceiling) 74 made of resins is disposed on the vehicle compartment side of the roof panel 62 and the roof rail section 64 described above. The roof head lining 74 is formed by a base member 76 arranged in face-to-face relation to the roof panel 62 and the rail inner panel 68 as well as a surface layer 78 for covering the surface (i.e., the surface of the inner side of the vehicle compartment) of this base member 76. Incidentally, an outer end portion 74A of the roof head lining 74 is resiliently retained by the aforementioned opening weather strip 72.

Next, a description will be given of essential portions in accordance with this embodiment.

As shown in FIGS. 4 and 5, the above-described pillar garnish 40 is disposed with a predetermined interval with the substantially flat plate-shaped pillar inner panel 34, with the result that a predetermined space 80 is formed between the base member 42 of the pillar garnish 40 and the pillar inner panel 34. Similarly, as shown in FIG. 6, the outer end portion 74A of the roof head lining 74 is disposed with a predetermined interval with the rail inner panel 68, with the result that a predetermined space 82 is formed between the outer end portion 74A of the roof head lining 74 and the rail inner panel 68. Incidentally, the space 80 on the front pillar 20 side and the space 82 on the roof side rail 28 side communicate with each other. Further, the elongated case 26 accommodating the bag 16 and an elongated energy absorbing member 84 formed of a resin are juxtaposed in proximity to each other in these spaces 80 and 82, respectively. Specifically, the case 26 accommodating the bag 16 is located closer to the door opening side than the energy absorbing member 84. That is, on the front pillar 20 side, the energy absorbing member 84 is disposed on the vehicle front side of the space 80, while the case 26 accommodating the bag 16 is disposed on the vehicle rear side of the space 80. Meanwhile, on the roof side rail 28 side, the energy absorbing member 84 is disposed on the vehicle compartment inner side of the space 82, while the case 26 accommodating the bag 16 is disposed on the vehicle compartment outer side of the space 82. Hereafter, a description will be given centering on the structure on the front pillar 20 side.

Figure 1:
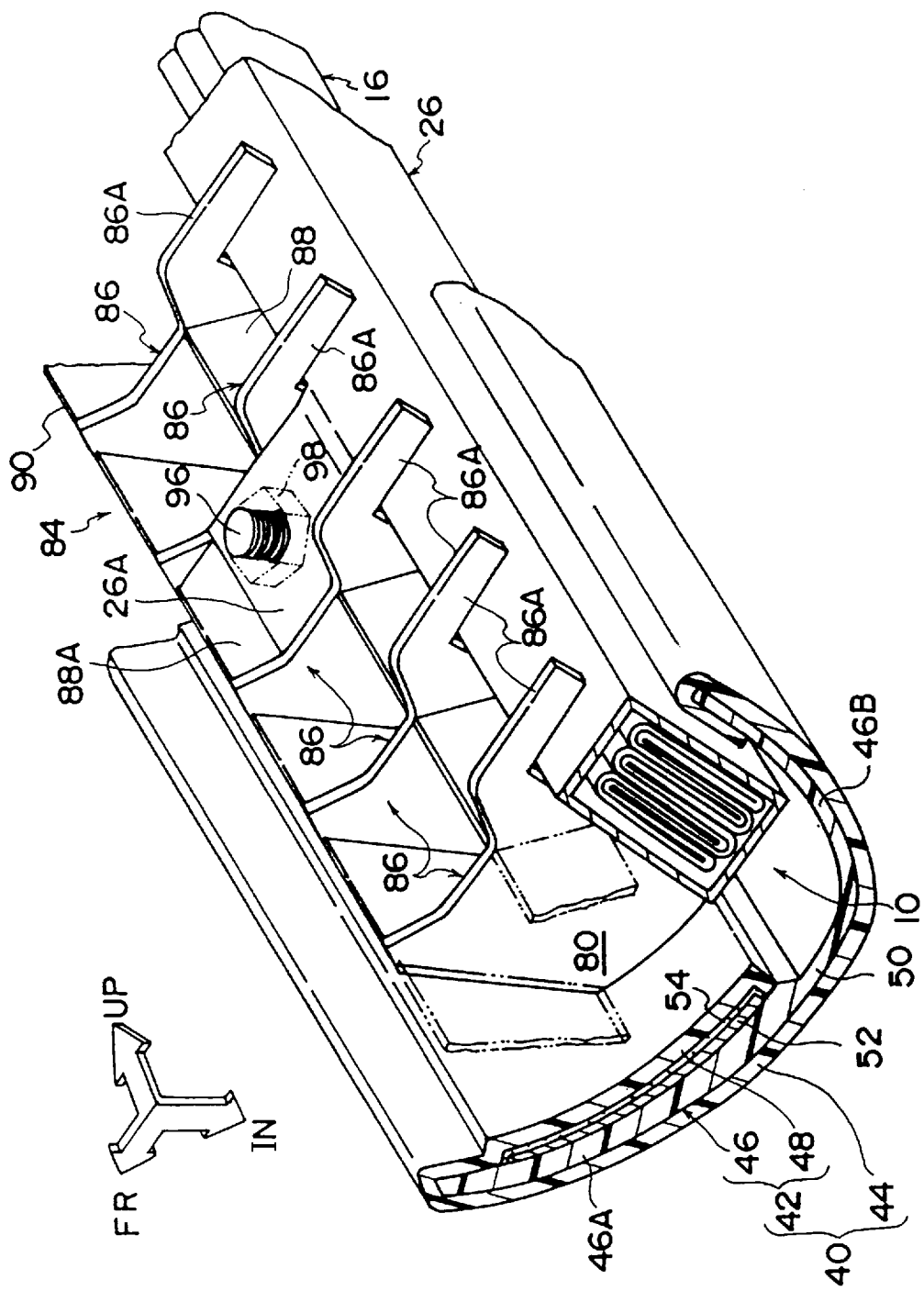
FIG. 1 is a perspective view illustrating a state in which an energy absorbing member and an air bag apparatus are juxtaposed inside a pillar garnish in accordance with a first embodiment of the present invention.

As shown in FIG. 1, the energy absorbing member 84 is provided with a plurality of ribs 86 (also called transverse ribs) whose planer directions are perpendicular to the longitudinal direction of the space 80 and which are arranged at predetermined equal intervals along the longitudinal direction of the garnish. These ribs 86 are the portions which constitute the nucleus of the energy absorbing member 84. In addition, the plurality of ribs 86 are connected to each other by a pair of connecting plates 88 and 90 (also called longitudinal ribs) whose planar directions are perpendicular to the plane of the rib 86 and which are arranged in the longitudinal direction of the vehicle substantially in face-to-face relation to each other, as well as by a bottom plate 92 (see FIGS. 4 and 5) abutting against the hard material 48 of the base member 42. Further, a narrow extending portion 86A, which extends toward the vehicle rear side of the space 80 along the configuration of the pillar inner panel 34, is formed integrally on an upper end portion (an end portion which is on the outer side of the vehicle compartment in an assembled state) of each of the aforementioned ribs 86. As a result, by means of the rear ends of the ribs 86, the extending portions 86A, and the bag accommodating portion 46B, a rear portion of the space 80 is formed in such a manner as to be partitioned from a front portion of the space 80. In this partitioned space, the case 26 with a rectangular cross section for accommodating the bag 16 in a folded state and holding the shape of the bag 16 is disposed closely to the members defining that partitioned space. Therefore, in the state in which the case 26 is disposed, the extending portions 86A of the aforementioned ribs 86 are arranged between a vehicle compartment outer side wall of the case 26 and the pillar inner panel 34 with their planar directions set in a direction perpendicular to the longitudinal direction of the case (FIG. 4).

It should be noted that the reason the extending portions 86A are interposed between the case 26 and the pillar inner panel 34 is that because the space 80 in the vicinity of the front pillar 20 is narrower than the space 82 in the vicinity of the roof side rail 28, the energy absorbing performance is secured also on the case 26 (the bag 16) side in this narrow space. Accordingly, in the vicinity of the roof side rail 28, the extending portions 86A are not formed on the energy absorbing member 84, and flat rectangular ribs 94 each having a longitudinal dimension longer than that of the aforementioned rib 86 are disposed instead (see FIG. 6). Further, the height of the rib 94 (the dimension from the rail inner panel 68 to a vehicle compartment-side front end) is set to be larger than the height of the case 26 accommodating the bag 16.

Further, as shown in FIGS. 1 and 5, an attaching portion 88A extending from the aforementioned connecting plate 88 is formed integrally between the two ribs 86 which are respectively disposed on both sides of a front-end fixing portion of the bag 16. In a state in which the pillar garnish 40 is mounted, this attaching portion 88A is disposed parallel to the projection 60 of the pillar inner panel 34. Further, a fin-like bag fixing portion 16D provided on the bag 16, as well as two case fixing portions 26A extending in such a manner as to cover the obverse and reverse surfaces of the bag fixing portion 16D, are fixed in advance to an upper surface of the attaching portion 88A by fixing means such as bonding, thermal bonding, or the like. As a result, the energy absorbing member 84 is integrally formed (subassembled) in advance with the case 26 accommodating the bag 16.

The energy absorbing member 84 and the case 26, which are subassembled in the above-described manner, are both fastened to the pillar inner panel 34 as a fixing bolt 96 is inserted from the reverse surface side (i.e., the vehicle compartment-side surface) of the attaching portion 88A, and is threadedly engaged with a nut 98 disposed on the reverse surface of the projection 60 of the pillar inner panel 34.

The above-described arrangement is similarly adopted for the roof side rail 28 side as well. To give a brief description, as shown in FIG. 6, an attaching portion 100 is formed integrally at a vehicle compartment outer end of the energy absorbing member 84. The fin-like bag fixing portion 16D, as well as the two case fixing portions 26A extending in such a manner as to cover the obverse and reverse surfaces of the bag fixing portion 16D, are fixed in advance between this attaching portion 100 and the rail inner panel 68 by the fixing means such as bonding, thermal bonding, or the like. The energy absorbing member 84 and the case 26 are both fastened to the rail inner panel 68 as a fixing bolt 102 is inserted from the reverse surface side of the attaching portion 100, and is threadedly engaged with a nut 104 disposed on the reverse surface (i.e., the surface of the roof head lining 74 side) of the rail inner panel 68.

It should be noted that, as the aforementioned fixing means, it is also possible to use riveting, screwing, clipping, or the like. In addition, adjustment is so provided that the energy absorption characteristic of the energy absorbing member 84 is made an appropriate characteristic by suitably selecting the number of the ribs 86 and 94 provided, and their intervals, external dimensions, thickness, material, and the like.

Next, a description will be given of the operation and advantages of this embodiment.

When a high load of a predetermined value or more is applied to a side of the vehicle body, the side collision of the high load is detected by the sensor 12. As a result, the inflator 14 is actuated, and a predetermined amount of gas is ejected. Consequently, the bag 16 begins to inflate, and the case 26 is fractured at its corner portion by the inflationary pressure at that time, and is thereby deployed. The inflated bag 16 is inflated below the roof side rail 28 in the shape of a curtain while pushing open the pillar garnish 40 of the front pillar 20 and the outer end portion 74A of the roof head lining 74 located at the roof side rail 28. As a result, the bag 16 is interposed between the side of the vehicle body and the head of the vehicle occupant in the front seat, thereby protecting the head of the occupant.

It should be noted that, to give a supplementary explanation of the inflating process of the bag 16, in this embodiment, since the plurality of noninflated portions 24 are formed in the vertically intermediate portion of the bag 16 as described above, the gas ejected from the inflator 14, after flowing into the front end portion 16A of the bag 16, diverges into upper and lower portions by the noninflated portion 24 located at the foremost end. Consequently, outer peripheral portions of the bag 16 are inflated in such a manner as to form a frame, and the gas subsequently flows into spaces between adjacent ones of the noninflated portions 24, inflating the relevant portions in the thicknesswise direction of the bag. Hence, a predetermined tension is applied between the adjacent ones of the noninflated portions 24, with the result that the bag 16 is inflated substantially in the shape of a parallelogram in which a large tension is acting along the tension line T connecting the front-end fixed point and the rear-end fixed point (see FIG. 3).

Meanwhile, during the side collision of a low load (i.e., when the load of a side collision is applied to such an extent that the air bag apparatus 10 is not actuated), the inflator 14 is not actuated. Accordingly, the bag 16 is prevented from being inflated and being interposed between the side of the vehicle body and the head of the occupant. In this case, however, the head of the occupant inertially moves toward the outer side of the vehicle compartment due to the inertial force at the time of the collision. Therefore, in the case of a vehicle occupant seated in the driver seat, for instance, there are cases where the head of the occupant moves in the direction of arrow A in FIG. 4, and secondarily collides against the pillar garnish 40. In this case, in accordance with this embodiment, since the energy absorbing member 84 made of resins and having the plurality of ribs 86 and the case 26 accommodating the bag 16 are juxtaposed close to each other in the space 80 between the pillar inner panel 34 and the pillar garnish 40, the load of the secondary collision during the secondary collision of the head of the occupant can be absorbed as the plurality of ribs 86 undergo plastic deformation (i.e., become buckled).

Similarly, in the case of an occupant seated in a rear seat (although this also applies to an occupant seated in the front seat), there are cases where the head of the occupant moves in the direction of arrow B in FIG. 6, an secondarily collides against the roof had lining 74. In this case as well, in accordance with this embodiment, since the energy absorbing member 84 made of resins and having the plurality of ribs 94 and the case 26 accommodating the bag 16 are juxtaposed close to each other in the space 82 between the rail inner panel 68 and the roof head lining 74, the load of the secondary collision during the secondary collision of the head of the occupant can be absorbed as the plurality of ribs 94 undergo plastic deformation (i.e., become buckled). Accordingly, in accordance with this embodiment, even an arrangement is adopted in which the case 26 accommodating the bag 16 is disposed between the pillar inner panel 34 and the pillar garnish 40 and between the rail inner panel 68 and the roof head lining 74, it is possible to reliably absorb the load in the secondary collision of the head of the occupant during the side collision of a low load.

Further, in accordance with this embodiment, in the vicinity of the front pillar 20, since the ribs 86 of the energy absorbing member 84 are made to project toward the case 26 side and the extending portions 86A are interposed between the pillar inner panel 34 and the case 26, it is possible to obtain an energy absorbing effect on the case 26 side as well. For instance, in a case where the moving direction of the head of the occupant in the driver seat has deviated slightly from the direction of arrow A and has been directed in the direction of arrow A' shown in the same drawing, the energy absorbing effect due to the plastic deformation of the extending portions 86A works. As a result, it is possible to improve the performance of protecting the head of the occupant during the side collision of a low load.

In addition, since the arrangement provided is such that the energy absorbing member 84 made of resins is provided with the plurality of ribs 86 and 94, and the energy is absorbed by allowing the ribs 86 and 94 to undergo plastic deformation, it is possible to obtain an intended energy absorbing effect by adjusting the material, hardness, thickness, the number of pieces provided, and the like of the ribs 86 and 94. Hence, it is possible to further improve the performance of protecting the head of the occupant during the side collision of a low load.

Furthermore, in accordance with this embodiment, the case 26 accommodating the bag 16 and the energy absorbing member 84 are formed integrally in advance (i.e., subassembled), and all of these subassembled members are fastened together to the pillar inner panel 34 and the rail inner panel 68 by fastening means such as the fixing bolts 96 and 102 and the nuts 98 and 104; therefore, as compared with a case where the case 26 accommodating the bag 16 and the energy absorbing member 84 are separately and independently assembled onto the pillar inner panel 34 andthe rail inner panel 68, it is possible to attain a reduction in the number of members fastened and the number of assembling steps and shorten the assembly operation time. Consequently, it is possible to attain a substantial reduction in cost.

Moreover, in accordance with this embodiment, since the bag 16 is located closer to the door opening side than the energy absorbing member 84, the bag 16 is smoothly inflated and deployed between the side of the vehicle body and the head of the occupant during the side collision of a high load, thereby protecting the head of the occupant. Namely, it is possible to prevent the deployment of the bag 16 from being hampered by the energy absorbing member 84. On the other hand, during the side collision of a low load during which the inflator 14 is not actuated, the energy absorbing member 84 is disposed at a position where the head of the occupant easily abuts, so that the load in the secondary collision of the head of the occupant is effectively absorbed by the energy absorbing member 84. As a result, in accordance with this embodiment, it is possible to make compatible the improvement of the bag deployment performance during the side collision of a high load and the improvement of the performance of protecting the head of the occupant during the side collision of a low load.

In addition, by virtue of the above-described positional relationship of the bag 16 and the energy absorbing member 84, it is possible to enhance the energy absorbing effect at the time when the head of the occupant has secondarily collided against the roof head lining 74 from the direction of arrow B in FIG. 6. Namely, when the head of the occupant has secondarily collided against the roof head lining 74 from that direction, the head of the occupant first abuts against the ribs 94 of the energy absorbing member 84 via the roof head lining 74. Then, since the outer end portion 74A of the roof head lining 74 is easily deformed toward the bag 16 side, the head of the occupant undergoes a counterclockwise rotary motion in FIG. 6 while deforming the outer end portion 74A toward the bag 16 side. Consequently, as compared with a case where the head of the occupant undergoes a linear motion, the moving stroke of the head of the occupant becomes large, so that the load of the secondary collision can be absorbed efficiently.

Further, in accordance with this embodiment, since the height of the energy absorbing member extending from the rail inner panel 68 toward the inner side of the vehicle compartment is set to be larger than the height of the bag 16, the head of the occupant first abuts against the energy absorbing member 84 during the side collision of a low load, and the load in the secondary collision of the head of the occupant is reliably absorbed by the energy absorbing member 84. For this reason, an outstanding advantage can be obtained in that the load in the secondary collision of the head of the occupant during the side collision of a low load can be reliably absorbed by the energy absorbing member 84.

In addition, in accordance with this embodiment, since the bag 16 is accommodated in the elongated case 26, it is possible to prevent foreign objects from entering the interior of the bag 16, and handling is also facilitated. Also, it is possible to expect an energy absorbing effect derived from the case 16 itself.

Figure 7:
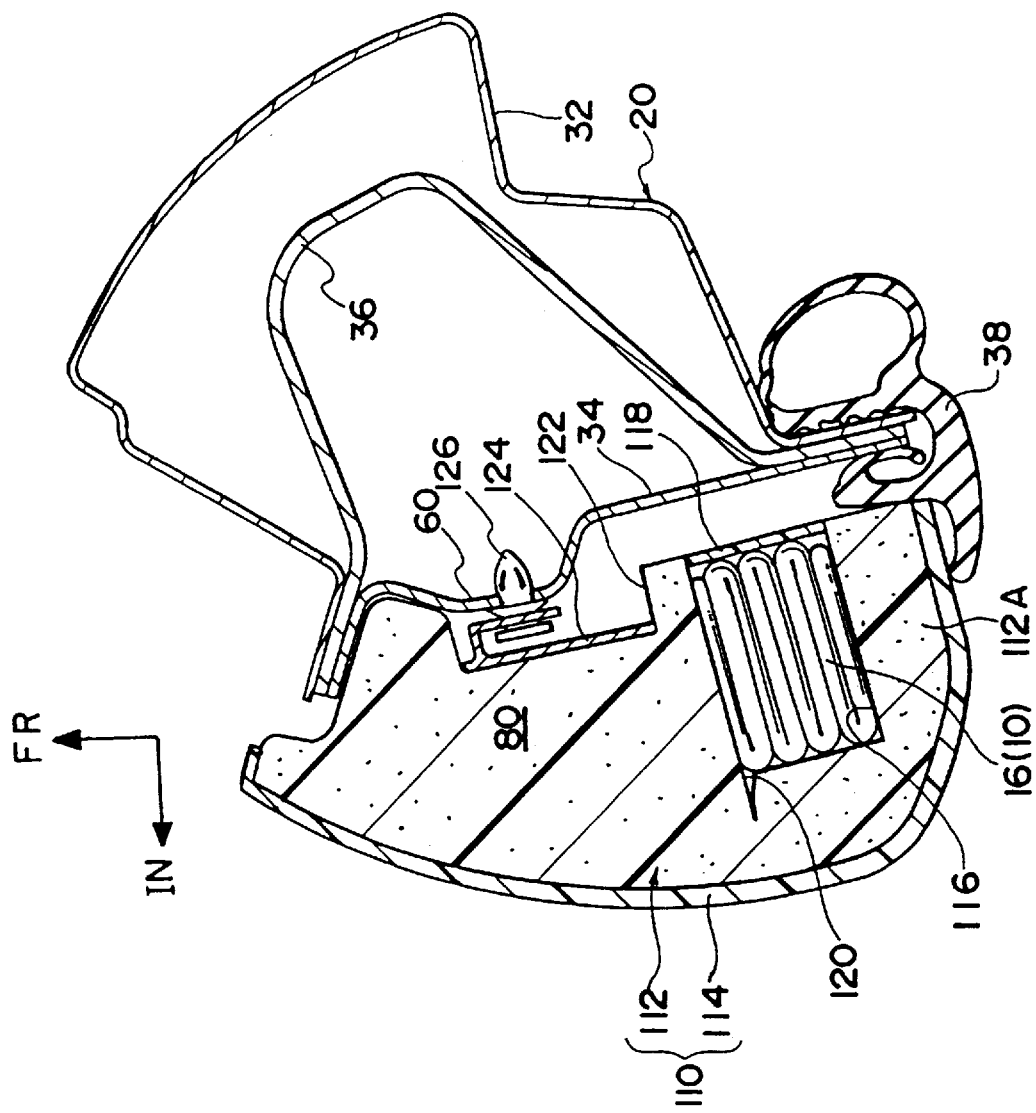
FIG. 7 is an enlarged cross-sectional view corresponding to FIG. 4 and illustrating essential portions in accordance with a second embodiment of the present invention.

Referring now to FIG. 7, a description will be given of a second embodiment of the present invention. Those component parts which are identical to those of the above described first embodiment will be denoted by the same reference numerals, and a description thereof will be omitted.

As shown in FIG. 7, this embodiment is characterized in that a base member 112 of a pillar garnish 110 is formed of a foam material such as expanded beads and urethane foam. The base member 112 is foamed into a shape which substantially closes the aforementioned space 80, and its surface on the inner side of the vehicle compartment is covered with a surface layer 114. Further, a bag accommodating portion 116 having a deep bottom and a rectangular cross section is formed in a vehicle rear-side portion of the base member 112. For this reason, a vehicle rear-side end portion 112A of the base member 112 is provided with a thinner wall thickness as compared with the other portions thereof. The aforementioned bag 16 is accommodated in this bag accommodating portion 116 in a folded state. Accordingly, in this embodiment, the bag accommodating portion 116 also functions as the case 26 used in the first embodiment for accommodating the bag 16. Incidentally, a cover 118 formed of a resin or the like is attached to an opening-side end portion of the bag accommodating portion 116 in such a manner that the cover 118 will not come off.

Further, a slit 120 which is cut into the surface layer 114 is formed at a front-side corner portion of the bag accommodating portion 116 on the inner side of the vehicle compartment. As a result, the front-side corner portion of the bag accommodating portion 116 on the inner side of the vehicle compartment is made fragile. In addition, a shallow-bottom recessed portion 122 is formed in the center of an end portion of the base member 112 on the outer side of the vehicle compartment. An attaching seat 124 having a hook-shaped cross section is provided on the bottom of this recessed portion 122. As a clip 126 fitted in this attaching seat 124 is resiliently engaged in an attaching hole formed in the projection 60 on the pillar inner panel 34, the pillar garnish 110 is fixed to the pillar inner panel 34.

In accordance with the above-described arrangement, during a side collision of a high load, the inflator 14 is actuated, and a gas flows into the bag 16. As a result, the rear-side end portion 112A of the base member 112 is removed from the opening weather strip 38 by the inflationary pressure of the bag 16, and is deployed using the slit 120 as a starting point of deployment. Hence, the bag 16 projects outward under the inflationary pressure. It should be noted that since the base member 112 is formed of a foam material, the deployment of the end portion 112A of the base member 112 is effected smoothly during the inflation of the bag 16.

On the other hand, in the case of a side collision of a low load, the load in the secondary collision of the head of the occupant is absorbed by the deformation of the base member 112 filled and disposed in the space 80.

Thus, in accordance with this embodiment, since the base member 112 of the pillar garnish 110 is formed of a foam material and is filled and disposed in the space 80, even if the arrangement is adopted in which the bag 16 is disposed between the pillar inner panel 34 and the pillar garnish 110 in the same way as in the above-described first embodiment, it is possible to reliably absorb the load in the secondary collision of the head of the occupant during the side collision of a low load.

Moreover, in accordance with this embodiment, since the energy absorbing member is arranged by forming the base member 112 of a foam material, it is possible to obtain an intended energy absorbing effect by adjusting the material, hardness, and the like of the foam material. Hence, it is possible to further improve the performance of protecting the head of the occupant during the side collision of a low load.

Further, in accordance with this embodiment, since the bag accommodating portion 116 also functions as the case 26 for accommodating the bag 16, the case 26 can be disused. Moreover, since the base member 112 serving as the energy absorbing member can be obtained by the foaming of the foam material, it is unnecessary to separately provide an energy absorbing member. For these reasons, in accordance with this embodiment, it is possible to reduce the number of parts and effect a reduction in cost.

Further, due to the fact that the resin-made case 26 having predetermined hardness can be disused, it is possible to overcome the sensation of touching a foreign material when the occupant has touched the outer case 114 of the pillar garnish 110. In addition, since the base member 112 is formed of a foam material with a large thickness, it is possible to obtain a soft pillar garnish 110. For these reasons, it is possible to improve the feel of the pillar garnish 110.

It should be noted that although the slit 120 is formed in the base member 112, and the slit portion is used as a deployment hinge, the arrangement is not limited to the same, and the slit 120 may be disused. In this case, the rear-end corner portion of the base member 112 on the inner side of the vehicle compartment serves as the deployment hinge.

Figure 8:
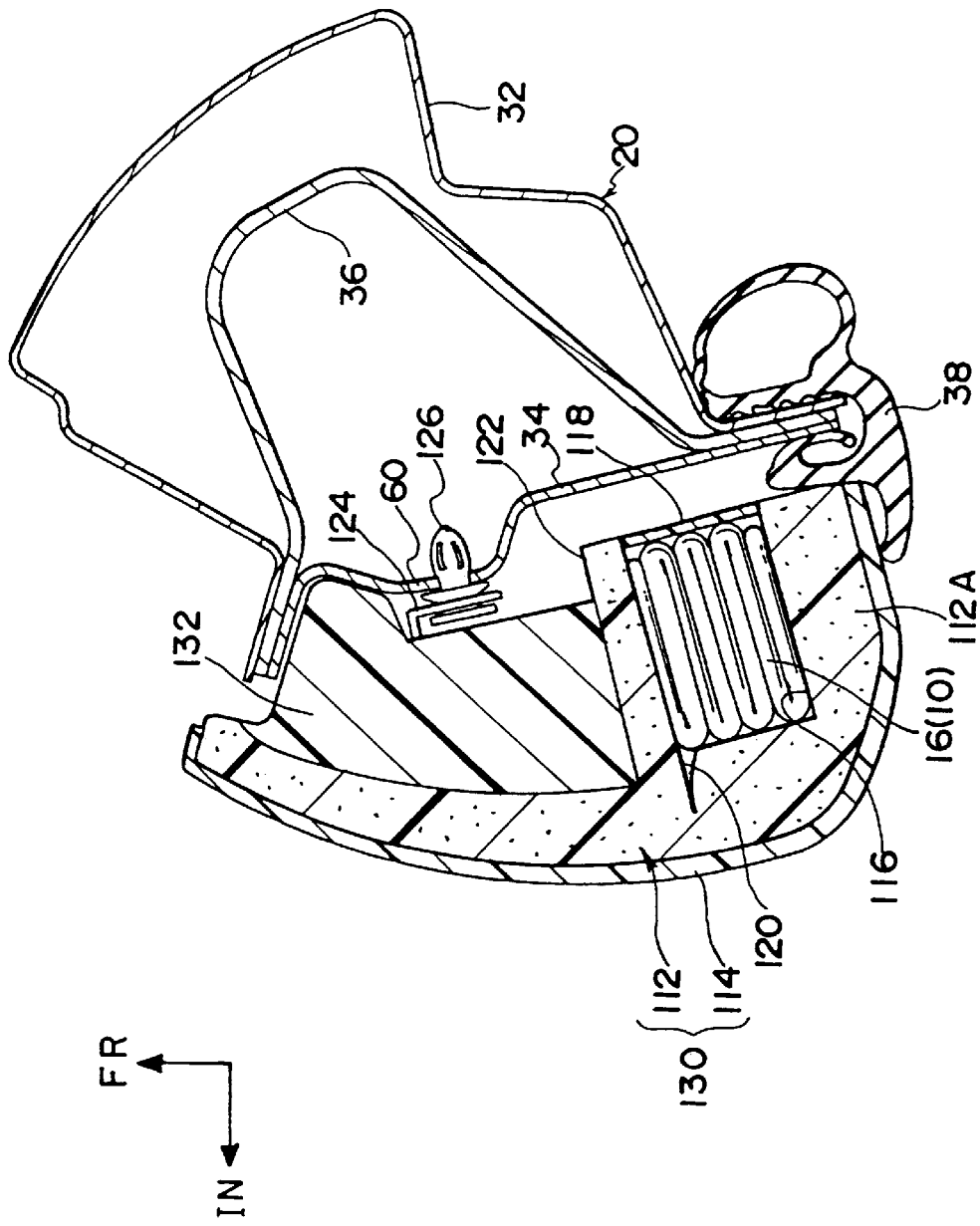
FIG. 8 is an enlarged cross-sectional view corresponding to FIG. 7 and illustrating essential portions in accordance with a third embodiment of the present invention.

Referring now to FIG. 8, a description will be given of a third embodiment of the present invention. Those component parts which are identical to those of the above-described embodiments will be denoted by the same reference numerals, and a description thereof will be omitted.

As shown in FIG. 8, in a pillar garnish 130 in accordance with this embodiment, the same base member 112 as the base member 112 used in the above-described second embodiment is used, so that it can be said that the structure is similar. However, in this embodiment, an improvement is made in that an energy absorbing member 132 having an energy absorption characteristic different from that of the base member 112 is provided on a vehicle front side portion of the base member 112. For this reason, the pillar garnish 130 is formed as a composite of members having two kinds of energy absorption characteristics. Incidentally, the energy absorbing member 132 may be elongated or rib-shaped.

In accordance with the above-described arrangement as well, since the basic arrangement is similar to the arrangement of the above-described second embodiment, it is possible to obtain operation and advantages similar to those of the second embodiment. In addition, in this embodiment, since the energy absorbing member 132 having an energy absorption characteristic different from that of the base member 112 is provided, it is easily possible to adjust the total energy absorption characteristic of the pillar garnish 130 by suitably selecting the position where the energy absorbing member 132 is disposed, the number of pieces provided, external dimensions, material, hardness, and the like of the energy absorbing member 132. As a result, it is possible to widen the range of energy absorption characteristics which can be selected.

Furthermore, although, in the above-described embodiments of the present invention, the bag 16 is arranged to be accommodated in the elongated case 26 or the bag accommodating portion 116, the present invention is not limited to the same, and it is possible to adopt an arrangement in which the case 26 or the bag accommodating portion 116 is disused.

Figure 9:
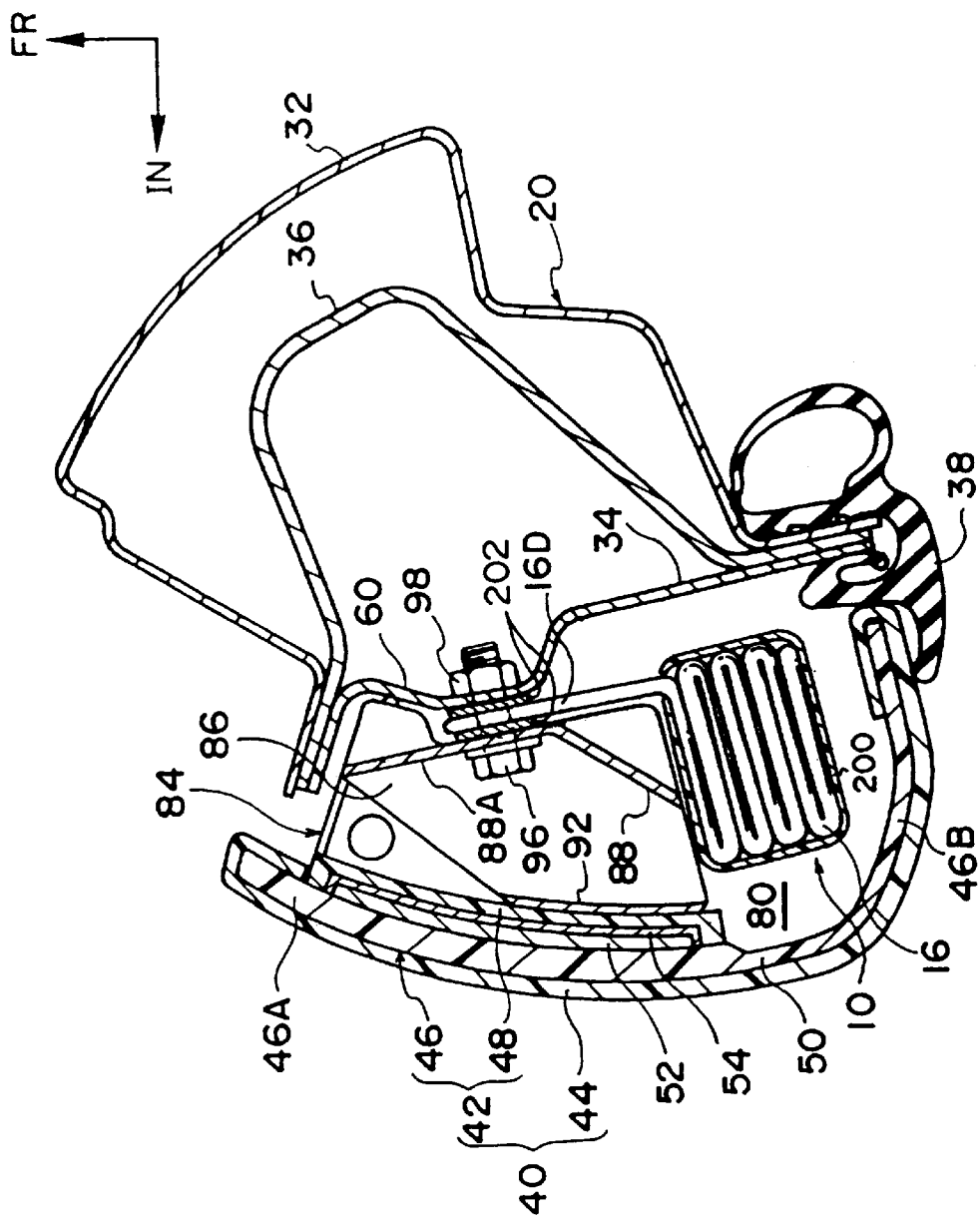
FIG. 9 is an enlarged cross-sectional view corresponding to FIG. 5 and illustrating essential portions in accordance with a further embodiment of the present invention in which a wrapping material is used instead of the case.
Figure 10:
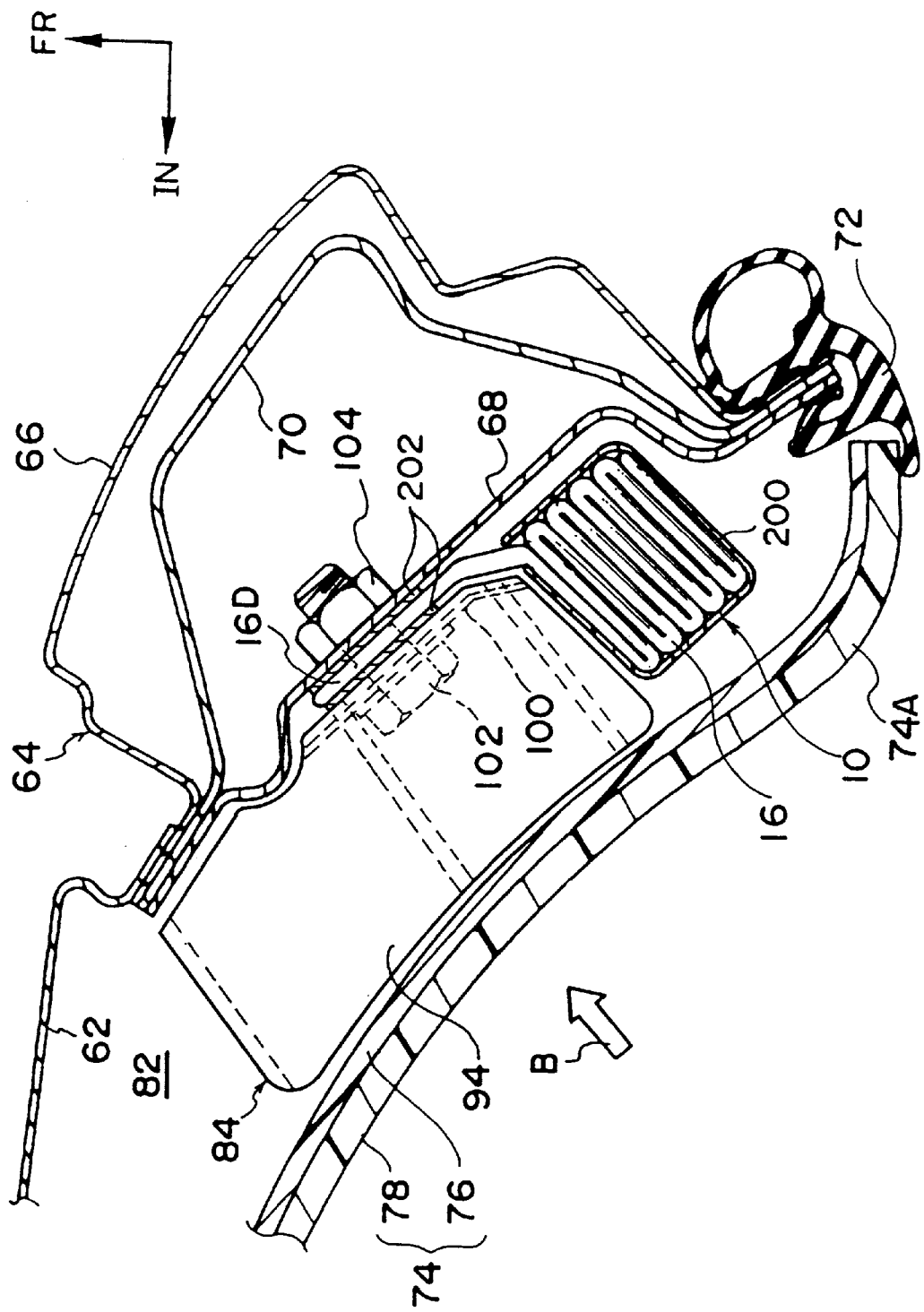
FIG. 10 is an enlarged cross-sectional view corresponding to FIG. 6 and illustrating essential portions in accordance with the further embodiment of the present invention in which the wrapping material is used instead of the case.
Figure 11:
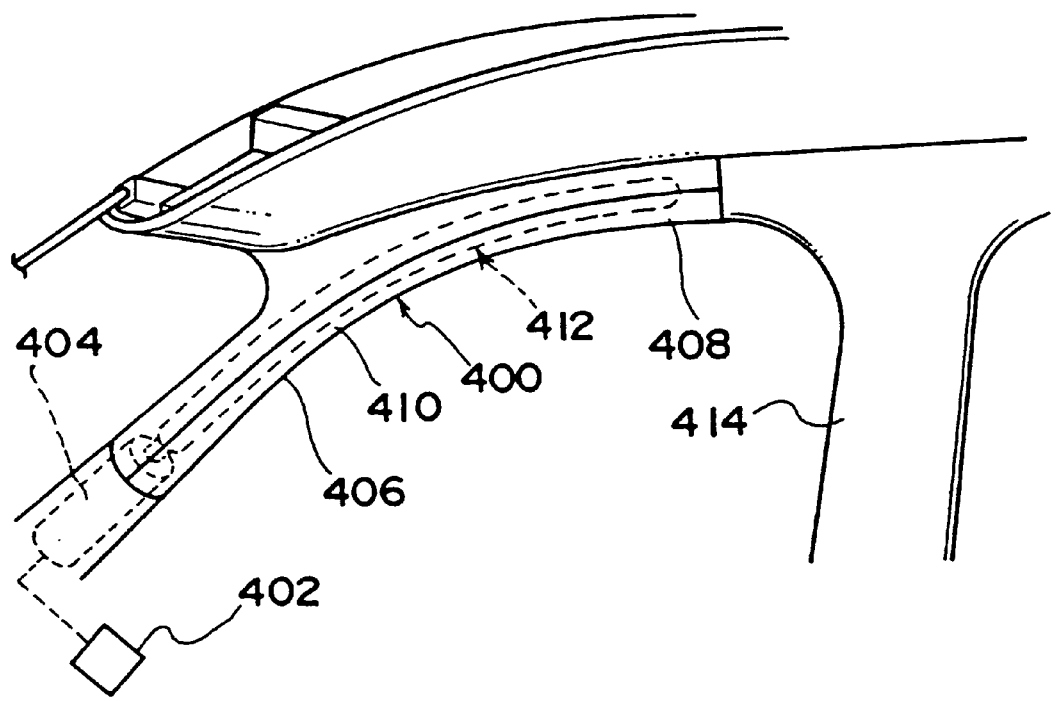
FIG. 11 is a schematic diagram illustrating a conventional occupant protective apparatus for a vehicle.

For instance, in a further embodiment shown in FIGS. 9 and 10, an arrangement is adopted in which the bag 16 folded in an elongated shape is partially wrapped by using a wrapping material (in a broad sense, the wrapping material can be regarded as a "covering material") 200 which can be ruptured. Incidentally, a pair of washers 202 are respectively provided at the positions where the pair of case fixing portions 26A are disposed in the above-described embodiments. That is, in FIG. 9, the arrangement provided is such that after the washers 202 are respectively disposed on the obverse and reverse surfaces of the bag fixing portion 16D, the attaching portion 88A of the energy absorbing member 84 together with these members are fastened to the pillar inner panel 34 by means of the fixing bolt 96 and the nut 98. In addition, in FIG. 10, the arrangement provided is such that after the washers 202 are respectively disposed on the obverse and reverse surfaces of the bag fixing portion 16D, the attaching portion 100 of the energy absorbing member 84 together with these members are fastened to the rail inner panel 68 by means of the fixing bolt 102 and the nut 104. In addition, it is also possible to adopt an arrangement in which the bag 16 in the folded state is tentatively secured by a belt-shaped hook-and-loop fastener instead of the aforementioned wrapping material 200.

What is claimed is:

1. A structure for arrangement of an occupant protective apparatus for a vehicle, comprising:

an inflator disposed at a predetermined position of a vehicle body that ejects a gas at a time of a side collision when a high load is applied to a side of the vehicle body;

a bag stored in a folded state in such a manner as to extend between a front pillar and a roof side rail and inflatable in a shape of a curtain below the roof side rail in a vehicle compartment by the gas supplied from said inflator, said bag being disposed in a space formed between a body panel and an interior member disposed on an inner side of the vehicle compartment with a predetermined interval with the body panel; and an energy absorbing member provided in said space and disposed in close proximity to said bag so as to absorb an impact from the inner side of the vehicle compartment, wherein said bag is located closer to a door opening of the vehicle than said energy absorbing member.

2. A structure for arrangement of an occupant protective apparatus for a vehicle according to claim 1, wherein the height of said energy absorbing member extending from the body panel toward an inner side of the vehicle compartment is set to be larger than the height of said bag in the folded state.

3. A structure for arrangement of an occupant protective apparatus for a vehicle according to claim 1, wherein at least said bag and said energy absorbing member are integrally assembled in advance, and at least said bag and said energy absorbing member which have been integrally assembled in advance are jointly fastened to the body panel.

4. A structure for arrangement of an occupant protective apparatus for a vehicle according to claim 1, wherein said energy absorbing member has an extending portion which is provided in such a manner as to extend between said bag and a pillar inner panel which is a portion of the body panel in a vicinity of the front pillar.

5. A structure for arrangement of an occupant protective apparatus for a vehicle according to claim 1, further comprising:

a case disposed in the space formed between the body panel and the interior member disposed on the inner side of the vehicle compartment with the predetermined interval with the body panel, said case being formed in an elongated shape to accommodate said bag.

6. A structure for arrangement of an occupant protective apparatus for a vehicle according to claim 1, wherein said energy absorbing member is a rib made of a resin.

7. A structure for arrangement of an occupant protective apparatus for a vehicle comprising:

an inflator disposed at a predetermined position of a vehicle body that ejects a gas at a time of a side collision when a high load is applied to a side of the vehicle body;

a bag stored in a folded state in such a manner as to extend between a front pillar and a roof side rail and inflatable in a shape of a curtain below the roof side rail in a vehicle compartment by the gas supplied from said inflator, said bag being disposed in a space formed between a body panel and an interior member disposed on an inner side of the vehicle compartment with a predetermined interval with the body panel; and an energy absorbing member provided in said space and disposed in close proximity to said bag so as to absorb an impact from the inner side of the vehicle compartment, wherein said energy absorbing member is constituted by a base member formed of a foam material and disposed on the inner side of the vehicle compartment with respect to the front pillar, and said bag is accommodated in a recessed portion provided in said base member.

8. A structure for arrangement of an occupant protective apparatus for a vehicle according to claim 7, wherein said energy absorbing member is provided with an energy absorbing member disposed in a portion of said base member and having an energy absorption characteristic different from that of said base member.

9. A structure for arrangement of an occupant protective apparatus for a vehicle according to claim 1, wherein said interior member and said energy absorbing member are disposed at least along the front pillar.

* * * * *